US011595800B2

(12) United States Patent
Girardier et al.

(10) Patent No.: US 11,595,800 B2
(45) Date of Patent: Feb. 28, 2023

(54) BLUETOOTH AUDIO STREAMING PASSTHROUGH

(71) Applicant: Google LLC, Mountain View, CA (US)

(72) Inventors: Thomas Girardier, Bourg la Reine (FR); Antoine Soulier, Carrieres sur Seine (FR)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/103,363

(22) Filed: Nov. 24, 2020

(65) Prior Publication Data

US 2021/0160673 A1   May 27, 2021

(30) Foreign Application Priority Data

Nov. 26, 2019 (EP) ..................................... 19306521

(51) Int. Cl.
*H04W 4/80* (2018.01)
*H04L 65/70* (2022.01)

(52) U.S. Cl.
CPC ............... *H04W 4/80* (2018.02); *H04L 65/70* (2022.05)

(58) Field of Classification Search
CPC ................................ H04W 4/80; H04L 65/607
USPC ........................................................ 455/41.2
See application file for complete search history.

(56) References Cited

U.S. PATENT DOCUMENTS

| 8,224,247 | B2 | 7/2012 | Kidron et al. | |
|---|---|---|---|---|
| 8,483,699 | B1 | 7/2013 | Oroskar | |
| 9,544,718 | B2 * | 1/2017 | Song | H04L 65/1086 |
| 9,756,455 | B2 | 9/2017 | Kawabe et al. | |
| 10,212,569 | B1 * | 2/2019 | Huang | H04W 88/16 |
| 10,701,538 | B1 * | 6/2020 | Elliot | H04W 72/0453 |
| 2002/0072816 | A1 * | 6/2002 | Shdema | H04S 1/00 700/94 |

(Continued)

FOREIGN PATENT DOCUMENTS

| EP | 2292062 A1 | 3/2011 |
|---|---|---|
| EP | 2129170 B1 | 2/2012 |

(Continued)

OTHER PUBLICATIONS

Partial European Search Report dated Apr. 15, 2020 from European Application No. 19306521.6, 12 pages.

(Continued)

*Primary Examiner* — Wayne H Cai
(74) *Attorney, Agent, or Firm* — Kilpatrick Townsend & Stockton LLP

(57) ABSTRACT

A Bluetooth audio streaming passthrough, and a method for transmitting an audio stream over a Bluetooth communication link and disclosed. The method is carried out by a source device. An audio codec configuration and a sampling rate of the audio stream are received, the audio stream coming from a streaming application running on the source device. A Bluetooth audio stream between the source device and a sink device is configured using the received audio codec configuration and sampling rate. The first audio stream is received from the streaming application. The received first audio stream is packetized into the Bluetooth audio stream. The Bluetooth audio stream is transmitted to the sink device over the Bluetooth communication link, including the packetized received audio stream.

20 Claims, 15 Drawing Sheets

(56) References Cited

U.S. PATENT DOCUMENTS

| | | | |
|---|---|---|---|
| 2005/0119827 A1* | 6/2005 | Willer | G01S 19/35 701/470 |
| 2006/0036436 A1 | 2/2006 | Halcrow et al. | |
| 2008/0133227 A1* | 6/2008 | Kong | G10L 19/00 704/230 |
| 2008/0287063 A1* | 11/2008 | Kidron | G10L 19/167 455/41.2 |
| 2009/0076825 A1 | 3/2009 | Bradford et al. | |
| 2010/0122005 A1* | 5/2010 | Kong | G06F 13/24 710/260 |
| 2010/0150383 A1 | 6/2010 | Sampat | |
| 2010/0195539 A1* | 8/2010 | Tian | H04L 47/828 370/255 |
| 2010/0303244 A1 | 12/2010 | Kim et al. | |
| 2011/0103593 A1* | 5/2011 | Sutharsan | H03H 17/04 381/23 |
| 2012/0120857 A1* | 5/2012 | Sudak | H04W 74/0808 370/311 |
| 2012/0290306 A1 | 11/2012 | Smyth et al. | |
| 2015/0319557 A1* | 11/2015 | El-Hoiydi | H04L 1/08 455/41.2 |
| 2016/0162015 A1* | 6/2016 | Moon | G06F 1/3287 713/310 |
| 2016/0205148 A1 | 7/2016 | Lee et al. | |
| 2016/0253997 A1* | 9/2016 | Kerr | G10L 15/28 381/110 |
| 2016/0359925 A1 | 12/2016 | Song | |
| 2017/0171697 A1 | 6/2017 | Song | |
| 2018/0151187 A1 | 5/2018 | Sørensen et al. | |
| 2018/0353855 A1* | 12/2018 | Niemeyer | A63F 13/424 |
| 2019/0311714 A1* | 10/2019 | Barbello | G06F 40/58 |
| 2020/0128291 A1* | 4/2020 | Morales | H04N 21/6408 |

FOREIGN PATENT DOCUMENTS

| | | |
|---|---|---|
| EP | 2773134 A1 | 9/2014 |
| EP | 3318089 A1 | 5/2018 |

OTHER PUBLICATIONS

Extended European Search Report for European Application No. 19306521.6 dated Jul. 22, 2020, 15 pages.

Extended European Search Report for European Application No. 19305702.3 dated Oct. 24, 2019, 8 pages.

ISR/WO for International Application No. PCTEP2020064993 dated Jun. 23, 2020, 9 pages.

International Preliminary Report on Patentability for International Application No. PCT/EP2020/064993 dated Dec. 9, 2021. 8 pages.

Extended European Search Report for European Patent Application No. 22157062.5 dated May 19, 2022. 13 pages.

\* cited by examiner

BLUETOOTH AUDIO STREAMING PASSTHROUGH

CROSS REFERENCE TO RELATED APPLICATIONS

This application claims the benefit of European Application No. EP19306521.6, filed on Nov. 26, 2019, which is incorporated by reference herein in its entirety for all purposes.

BACKGROUND

Bluetooth defines a communication standard for transmitting and receiving audio data wirelessly over distances which are typically limited up to 10 meters and using radio waves with a frequency comprised in the Ultra High Frequency band. This standard makes Bluetooth devices very popular among customers due to their portability, and in particular, for short-range applications.

The audio quality of the transmitted and received data depends mainly on digital audio encoders and decoders, called codecs, which are used to transfer data to Bluetooth audio output devices like headphones or loudspeakers. The use of standard Bluetooth codecs, namely, the low-complexity subband codec called SBC, is necessary as it is designed to provide a reasonably good audio quality at medium bit rates while keeping low computational complexity. Further, SBC supports mono and stereo streams with sampling frequencies up to 48 kHz while bitrates are usually being set up to 193 kbit/s and 328 kbit/s for mono and joint-stereo streams, respectively.

In view of improving the quality of transmitted and received audio data, a current trend is to propose codecs requiring increasingly large bandwidth usage, such as the APTX audio codec compression algorithm or the LDAC audio hybrid coding technology, which allows streaming audio over Bluetooth connections with bitrates up to 352 and 990 kbit/s, respectively.

Because of the need for lossy compression due to limited bandwidth, such codecs are being developed so as to limit the audio quality loss when using standard Bluetooth protocols and codecs, such as SBC.

However, the quality of an audio stream is not necessarily improved by using codecs which have a higher bandwidth usage, since achieving such a quality depends on the different coding, decoding, mixing and sampling processes which are used by audio devices for transmitting audio streams. This is true, in particular, for source devices such as smartphones and sink devices such as wireless headphones or speakers, when using the Bluetooth standard.

Moreover, the streaming applications used by the current audio listening devices rely on their own encoding format, which has a higher compression rate and better algorithms than the standard Bluetooth codecs such as SBC. This also implies that audio data being streamed between a source and a sink device suffers multiple decoding, encoding and resampling processes, resulting in possibly significant quality loss.

SUMMARY

The present disclosure relates to the field of audio streaming. Specifically, the present disclosure relates to methods and devices for transmitting an audio data stream using a Bluetooth communication link.

An object of the present disclosure is to provide methods and devices for improving the quality and the latency of an audio stream, and specifically, of an audio stream transmitted by Bluetooth.

To address at least some of the aforementioned issues, a first object of the disclosure relates to a method for transmitting an audio stream over a Bluetooth communication link, the method being carried out by a source device and comprising:

receiving an audio codec configuration and a sampling rate of the audio stream, said audio stream coming from a streaming application running on the source device;

configuring a Bluetooth audio stream between the source device and a sink device using the received audio codec configuration and sampling rate;

receiving the first audio stream from the streaming application;

packetizing the received first audio stream into said Bluetooth audio stream; and transmitting the Bluetooth audio stream to the sink device over the Bluetooth communication link, the transmitted Bluetooth audio stream comprising the packetized received audio stream.

Herein, Bluetooth refers to any version of the Bluetooth protocol, including existing and future versions. Currently, version 5.1 of Bluetooth comprises Basic Rate/Enhanced Data Rate protocol, also called BR/EDR protocol or Bluetooth classic protocol, and Bluetooth Low Energy protocol, also called BLE protocol.

Herein, a communication link designates a wireless communication between two devices. Further, a Bluetooth communication link is configured to include a plurality of Bluetooth physical links, for instance between a given source device and a given sink device, such as a smartphone. A Bluetooth communication link may comprise different types of links, such as a point-to-point connection or a one-way link.

Herein, packetizing designates transforming audio data into multiple audio data packets. Such audio data packets correspond to a given number of bytes.

Herein, a codec is a hardware or a software component configured for encoding and/or decoding digital data stream or a signal.

Herein, an audio codec configuration is a configuration which includes information such as a type of codec, a bitrate, i.e. a rate at which bits can be transferred from one location to another, and a corresponding integer size such as 16 bits or 24 bits. Types of codec comprise SBC, AAC, MP3, APT-X, LDAC, LHDC, Vorbis, Opus or LC3 codecs.

Herein, the streaming application is preferably an audio application or a gaming application which is configured to stream audio and/or video data.

The method according to the first object allows transmitting an audio stream over a Bluetooth communication link with reduced quality loss and lower latency. Indeed, the methods of the background art generally require source device and/or sink devices to perform an encoding, a decoding, and resampling or a mixing of the audio stream, which systematically results in a quality loss or in an increase of the latency.

Herein, an audio application can be any application providing a digital music, an access to an audio content or a podcast streaming service, such as a cloud-based streaming service or in general.

This allows providing a Bluetooth audio streaming passthrough. Namely, when the streaming application comprises a gaming application, this allows transmitting and streaming corresponding audio data over a Bluetooth communication link with a low latency, by streaming directly from the gaming application and bypassing the audio server to improve the latency.

Herein, an audio codec configuration can be empty. Typically, an empty audio codec configuration refers to non-encoded audio data, such as a pulse-code modulation, called PCM, or an analog audio signal which corresponds to a PCM audio codec configuration.

In an embodiment, the Bluetooth communication link is pre-established, that is, a Bluetooth communication link which is established between the source device and the sink device during a preliminary step which precedes the transmitting of the Bluetooth audio stream to the sink device.

In a specific embodiment, the receiving of the audio stream from the streaming application is carried out upon receipt of an unmodified bitstream from the streaming application.

Herein, a bitstream is a sequence of bits. Packets resulting from packetizing audio data can be grouped, encoded or decoded into contiguous pages of structured bitstream data, said contiguous pages being called logical bitstreams.

Herein, several logical bitstreams can be combined into a single physical bitstream. If a physical bitstream comprises more than one logical bitstream, such logical bitstreams are said to be "wrapped" in the physical bitstream. Unwrapping said logical bitstreams from the physical bitstream can be performed by decoding, although a complete decoding is not necessarily required for extracting multiple logical bitstreams.

Herein, an unmodified bitstream is a bitstream that is transmitted as such and is not resampled, for instance by an audio server located between the audio application and the Bluetooth stack of the source device.

In a specific embodiment, the method further comprises:
  receiving at least one other audio stream, called second audio stream, from an audio server; and
  transmitting said received second audio stream to the sink device over the Bluetooth communication link.

Herein, an audio server is any platform configured to manage and/or share audio resources or audio flows with other systems, said systems comprising, in particular, the source device and the sink device. For instance, said audio resources or audio flows comprise music from an audio application, sound notifications from a social media, sound from a clock alarm from a scheduling application, etc.

Herein, an audio server can comprise an audio hardware interface, an operating system, a computer, an electronic circuit or any kind of computer-readable medium on which audio data can be stored or that can receive and send a stream of audio data. Said audio server can be connected to a network like the Internet.

This provides a hybrid streaming method with two audio streams, said two audio streams being encapsulated in a single Bluetooth audio stream.

This allows the method of the first object to generate an alternative path for transmitting and streaming audio data, said path bypassing possible audio servers that are required in methods of the background art. Therefore, this allows avoiding performing coding, decoding, mixing or resampling implying quality loss on a receiving end of the Bluetooth communication link.

This also allows transmitting the audio streams with reduced quality loss and lower latency compared to known methods involving receiving and transmitting an audio stream from an audio server, since said methods require such an audio stream to be mixed with the audio stream coming from the streaming application, resulting in quality loss. Moreover, these methods also require the audio server to perform a mixing or a resampling of the audio streams using the sampling rate of the audio server or of the sink device, which results in a loss of quality and may also increase the latency.

In a specific embodiment, the Bluetooth audio stream is of a multi-contribution type, the method further comprising packetizing the received second audio stream into the Bluetooth audio stream using an audio codec configuration and a sampling rate of the second audio stream.

This provides a hybrid streaming method with two audio streams, said two audio streams being encapsulated in two Bluetooth audio streams on a single Bluetooth communication link.

Herein, a Bluetooth audio stream being of a multi-contribution type implies that the audio codec configuration (or the sampling rate) is used in a non-exclusive way. In other words, the audio codec configurations (or the sampling rates) of both the first audio stream and the second audio stream are used to configure the Bluetooth audio stream, which then corresponds to a multi-contribution type Bluetooth audio stream.

In a specific embodiment, the method further comprises:
  receiving, by the sink device, a plurality of Bluetooth audio streams transmitted by the source device;
  mixing the plurality of Bluetooth audio streams into a mixed audio stream; and
  rendering the mixed audio stream in the sink device.

This allows improving the quality and/or the latency of multiple audio streams on the receiving end of the Bluetooth communication link.

In a specific embodiment, the method further comprises wrapping the audio stream received from the streaming application and/or the received second audio stream into a container, said container being placed into the Bluetooth audio stream.

This allows encapsulating multiple audio streams in a single container, so that it is possible to transmit said streams in a same packet even if they correspond to different audio codec configurations and/or sampling rates. In other words, this provides a hybrid streaming method with two audio streams, said two audio streams being encapsulated in a single container which is sent from the source device in a single container.

In embodiments, the streaming application and the audio server use different codecs, and therefore, different audio codec configurations and different sampling rates. For instance, the application may use a high-quality codec for audio streaming and the audio server may use a low-quality codec for notifications.

For instance, an Ogg stream can be used to encapsulate one or several logical bitstreams created by one or several encoders of an audio server. Once encoded, an audio server logical bitstream can be wrapped into the container with the application logical bitstream, both logical bitstreams being transmitted to the sink device using a same packet. The sink device can then unwrap the two logical bitstreams, decode them separately using their respective codecs and mix them into a single raw stream to be output.

Herein, a container is an entity defining a media payload format. An audio container, which defines an audio payload format, can be associated with one or multiple codecs. For instance, a LATM container can be associated with an AAC codec, an Ogg container can be associated with a Vorbis or an Opus container.

In a specific embodiment, the container is an Ogg-Vorbis container.

In a specific embodiment, the audio stream received from the streaming application, called first audio stream, and the second audio stream are wrapped into the container, the packetizing of said first and second audio streams into the Bluetooth audio stream being carried out using the first and second wrapped audio streams.

In a specific embodiment, the first audio stream or the second audio stream is a Vorbis encoded stream, or the first audio stream and the second audio streams are Vorbis encoded streams.

In an embodiment, at least two Bluetooth logical links are used for transmitting audio streams.

This provides a hybrid streaming method for transmitting at least two audio streams. In particular, two audio streams are encapsulated in two Bluetooth audio streams, to be transmitted over the Bluetooth communication link.

This allows transmitting audio streams with a higher flexibility, since at least two Bluetooth logical links can be used. Even if there is already an established Bluetooth audio stream bypassing the audio server on a first Bluetooth logical link, a second Bluetooth audio stream can be used on a second Bluetooth logical link, e.g. for collecting notifications arising from another application running on the source device. Thus, this allows two Bluetooth audio streams to be transmitted on a same logical channel, or on two different logical channels.

For instance, if the streaming application is a gaming application, said gaming application can stream audio data directly towards a Bluetooth stack that the source device comprises. However, there is more flexibility in using at least two Bluetooth audio streams on two different Bluetooth logical links, since at least one Bluetooth audio stream can be used to render high quality audio from the gaming application, and at least another Bluetooth audio stream can be used to render sound from another source, such as sound notifications from a social media application running on the source device or coming from the audio server. The two logical links are either using the same Bluetooth physical link or two different ones.

In a specific embodiment, the method further comprises:
packetizing the received second audio stream into another Bluetooth audio stream, called second Bluetooth audio stream, said second Bluetooth audio stream being distinct from the Bluetooth audio stream configured between the source device and the sink device, called first Bluetooth audio stream, and
transmitting said second Bluetooth audio stream to the sink device over the Bluetooth communication link, the second Bluetooth audio stream being multiplexed with said first Bluetooth audio stream.

Herein, multiplexing is carried out using one or more protocols, such as an AVDTP protocol or any other protocol adapted for transmitting an audio stream over a Bluetooth communication link.

In a specific embodiment, the first Bluetooth audio stream or the second Bluetooth audio stream is transmitted over a BR/EDR link of the Bluetooth communication link, or the first Bluetooth audio stream and the second Bluetooth audio streams are transmitted over a BR/EDR link of the Bluetooth communication link.

In a specific embodiment, the second Bluetooth audio stream is transmitted over a BLE link of the Bluetooth communication link.

In a specific embodiment, the transmitting of the Bluetooth audio stream is performed upon a successful negotiation, with the sink device, of the audio codec configuration and of the sampling rate.

This allows ensuring that the sink device supports both the audio codec configuration and the sampling rate. This also allows the streaming application checking itself whether the sink device can support or not the native codec and the native sampling rate of the streaming application.

According to a second object, the disclosure relates to a method for receiving a Bluetooth audio stream over a Bluetooth communication link, the method being carried out by a sink device, wherein the method comprises:
receiving, a plurality of Bluetooth audio streams transmitted by a source device over the Bluetooth communication link;
mixing the plurality of received Bluetooth audio streams into a mixed audio stream; and
rendering the mixed audio stream.

In an embodiment of the method of the second object, at least one first Bluetooth audio stream among said received plurality of Bluetooth audio streams comprises a packetized audio stream, the packetizing of said audio stream into the first Bluetooth audio stream being performed by the source device, the first Bluetooth audio stream being configured between the source device and the sink device by the source device using an audio codec configuration and a sampling rate of a first audio stream, said audio codec configuration and said sampling rate being received by the source device, said first audio stream coming from a streaming application running on the source device.

In an embodiment of the method of the second object, the transmitting of the first Bluetooth audio stream is performed by the source device upon a successful negotiation, with the sink device, of the audio codec configuration and of the sampling rate.

In an embodiment, the method of the second object further comprises:
receiving, from the source device, at least a second audio stream over the Bluetooth communication link,
said second audio stream being received by the source device from an audio server, said second audio stream being different from the first audio stream.

In an embodiment, the method of the second object further comprises:
receiving, from the source device, a second Bluetooth audio stream over the Bluetooth communication link,
the second Bluetooth audio stream being multiplexed with the first Bluetooth audio stream, the received second audio stream being packetized by the source device into the second Bluetooth audio stream, said second Bluetooth audio stream being distinct from the first Bluetooth audio stream.

According to a third object, the disclosure relates to a computer program product comprising a computer readable medium having stored thereon computer program instructions loadable into a computing device and adapted to—when loaded into and executed by said computing device—cause the computing device to perform the steps of a method according to anyone of the previous embodiments.

According to a fourth object, the disclosure relates to a source device for transmitting an audio stream over a Bluetooth communication link, said source device being configured to:
receive an audio codec configuration and a sampling rate of the audio stream of a streaming application running on the source device;
configure a Bluetooth audio stream between the source device and a sink device, using the received audio codec configuration and sampling rate;

receive the audio stream from the streaming application;

packetize the received audio stream into said Bluetooth audio stream; and transmit the Bluetooth audio stream to the sink device, the Bluetooth audio stream comprising the packetized received audio stream.

According to a fifth object, the disclosure relates to a sink device for receiving a Bluetooth audio stream over a Bluetooth communication link, said sink device being configured to:

receive a plurality of Bluetooth audio streams transmitted by a source device over the Bluetooth communication link;

mix the plurality of Bluetooth audio streams into a mixed audio stream; and render the mixed audio stream at the sink device.

In an embodiment of the sink device of the fifth object, at least one Bluetooth audio stream among said received plurality of Bluetooth audio streams comprises a packetized audio stream, the packetizing of said audio stream into said at least one Bluetooth audio stream being performed by the source device, the at least one Bluetooth audio stream being configured between the source device and the sink device by the source device using an audio codec configuration and a sampling rate of a first audio stream, said audio codec configuration and said sampling rate being received by the source device, said first audio stream coming from a streaming application running on the source device.

According to a sixth object, the disclosure relates to a system for transmitting and receiving a Bluetooth audio stream over a Bluetooth communication link, said system comprising a source device according to the fourth object and a sink device according to the fifth object.

Other features, details and advantages of the objects of the disclosure will be apparent from the following detailed description given by way of non-limiting example, with reference to the accompanying drawings, as described hereafter.

DETAILED DESCRIPTION

Figures and the following detailed description contain, essentially, some exact elements. They can be used to enhance the understanding of the disclosure and, also, to define the disclosure if necessary.

Figure 1:
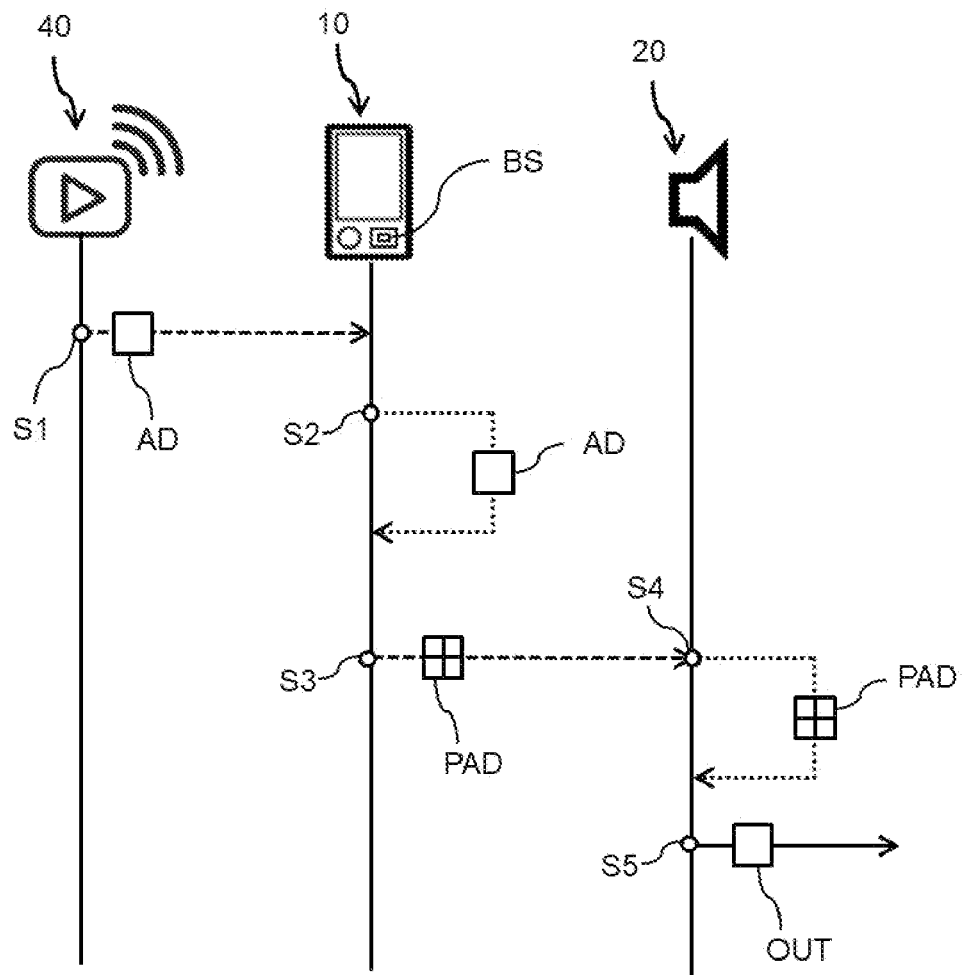
FIG. 1 illustrates an example of method steps according to a first embodiment of the disclosure.

FIG. 1 illustrates simplified method steps for transmitting an audio stream over a Bluetooth communication link, according to a first embodiment of the disclosure.

A method according to said first embodiment comprises encoding audio data AD as an encoded audio bitstream, said encoded audio bitstream being provided by an audio streaming application 40 to a sink device 20.

For instance, said audio streaming application is an audio application or a gaming application (e.g. on a remote server). For instance, said sink device 20 is a loudspeaker or wearable headphones.

The audio data AD is provided to the sink device 20 over a Bluetooth stack BS, said Bluetooth stack BS being included in a source device 10, e.g. a smartphone.

Herein, a Bluetooth stack BS refers to an implementation of a Bluetooth protocol stack, such as an embedded system implementation of the source device 10.

In an embodiment, the Bluetooth stack BS comprises a microcontroller and/or a chipset with an operating system and is configured to support various protocols such as L2CAP and AVDTP protocols, as is described hereafter.

During step S1, the audio streaming application 40 transmits the audio data AD to the source device 10 and said audio data is sent by the source device 10 directly to its Bluetooth stack BS, without modification of the audio data (i.e. without going through the audio server of the source device).

This allows the streaming application of the audio streaming application 40 to provide the audio data AD to the Bluetooth stack BS without requiring decoding, encoding and/or (re)sampling by an intermediary device/server.

During step S2, the audio data AD received by the Bluetooth stack BS is packetized into a packetized audio data PAD.

In an embodiment, at least one of the audio data AD and the packetized audio data PAD is a Bluetooth data packet, which can be transmitted using a Bluetooth wireless audio link.

During step S3, the source device 10 transmits the packetized audio data PAD to the sink device 20, said transmitting being carried out over one or more Bluetooth audio streams.

During step S4, the sink device 20 decodes the received packetized audio data PAD and sends the decoded data under the form of an audio output OUT, for instance, a PCM signal or broadcast music.

Figure 2:
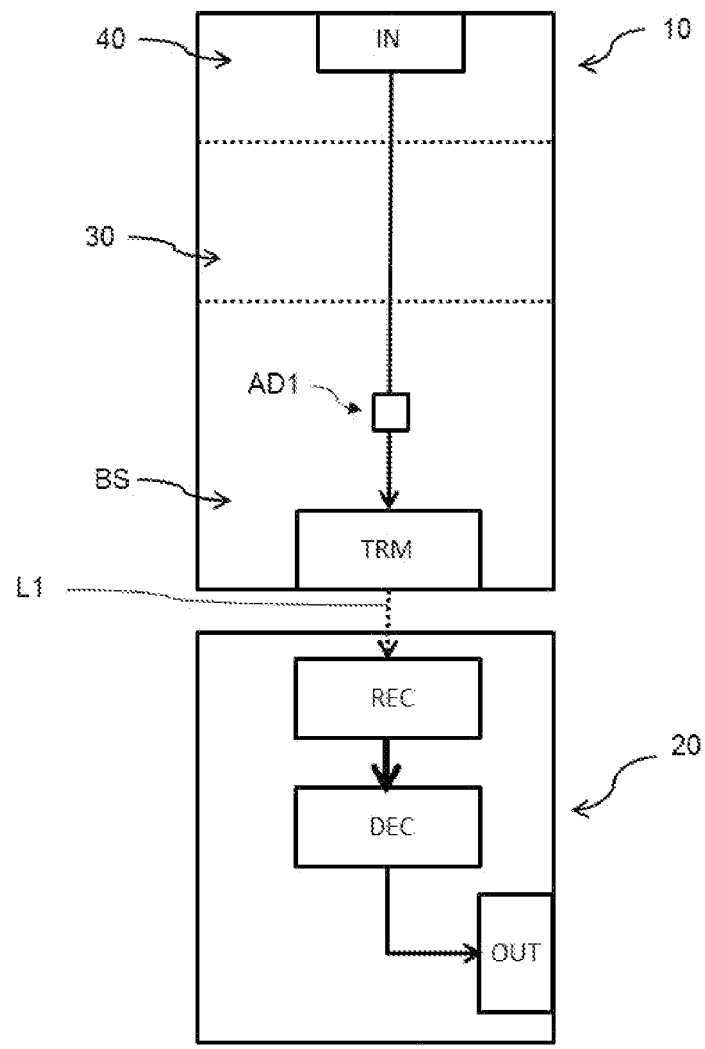
FIG. 2 illustrates a flowchart of method steps according to a first embodiment of the disclosure.

FIG. 2 illustrates a flowchart of method steps according to the first embodiment of the disclosure.

Upon receipt of audio data AD1, and in particular of an encoded audio bitstream, through an input IN of the source device 10, the streaming application 40 directly provides said audio data AD1 to the Bluetooth stack BS of the source device 10.

This allows bypassing any mixing, resampling and/or encoding step that could be carried out over AD1 by the source device 10 or by an audio server 30 which could be comprised in the source device 10.

The audio data AD1 is configured by the source device 10 using the audio codec configuration and the sampling rate of the audio stream of the streaming application 40 running on the source device 10. Prior to the execution of this step, the source device can receive the audio codec configuration and sampling rate of the audio stream from the streaming application when the streaming application first requests the opening of a new audio stream, or through other means. While providing the audio data AD1 to the Bluetooth stack BS, the Bluetooth stack BS packetizes it and transmits it to a third-party device, and here specifically, to the sink device 20.

In particular, the audio data AD1 is packetized into a configured Bluetooth audio stream using the audio codec configuration and the sampling rate of the audio stream of the streaming application 40.

Preferably, the packetized audio data or the configured Bluetooth audio stream is transmitted using a pre-established link, here a Bluetooth communication link L1. The Bluetooth communication link L1 can include one or more Bluetooth physical links and Bluetooth logical links, established or pre-established between the source device 10 and the sink device 20.

Upon receipt, the packetized audio data is decoded by the sink device 20. Subsequently, the decoded packet can be broadcast or streamed through an output OUT of the sink device 20.

This allows avoiding lossy transmission and/or compression during any of the aforementioned steps. In particular, this allows bypassing the use of an audio server.

Figure 3:
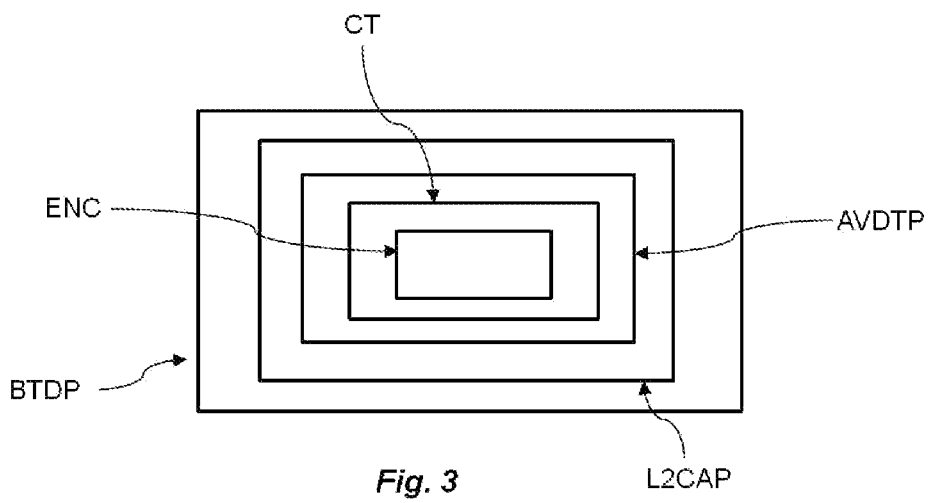
FIG. 3 illustrates an example of structure of a Bluetooth data packet according to the disclosure.

FIG. 3 illustrates an example of a structure of a Bluetooth data packet according to the disclosure, and more specifically, an example of such a structure for transmitting data using a Bluetooth communication link.

As illustrated, a Bluetooth data packet BTDP comprises several layers, packets, packet data units, frames and/or bitstreams. In particular, the Bluetooth data packet BTDP comprises a logical link control and adaptation protocol, called L2CAP, corresponding to a protocol data unit, called PDU. The L2CAP defines a protocol layer of the Bluetooth data packet BTDP for exchanging data between two channel identifiers, called CIDs.

Advantageously, the L2CAP also defines a link manager layer which implements one or more Bluetooth transport protocols. The L2CAP further enables segmenting data packets, assembling data packets, reassembling data packets, and/or multiplexing.

The L2CAP protocol further allows establishing a logical link between a Bluetooth chip of a device. The parameters of the L2CAP protocol may depend on the features of the source device, such as its ability to support other protocols, etc.

Preferably, the L2CAP protocol comprises an Audio/Video Distribution Transport Protocol, called AVDTP, which is a Bluetooth audio data transport protocol. An AVDTP protocol defines binary transactions between several Bluetooth devices and allows establishing an audio stream and/or a video stream between two stream endpoints, called SEPs.

Advantageously, the AVDTP protocol is configured for setting up a stream and for streaming an audio stream using the L2CAP protocol. The AVDTP protocol further allows a negotiation of the stream parameters and can manage an audio stream by itself.

The AVDTP protocol and the L2CAP protocol enable the exchange of data over a Bluetooth communication link, for instance between a source device and a sink device.

As illustrated, the AVDTP protocol comprises a media payload, called container CT, the container CT itself comprising an encoded frame ENC.

Preferably, the container CT comprises a media payload header and one or more encoded frames.

Herein, the container CT defines a physical bitstream and at least one encoded frame ENC defines a logical bitstream. The physical bitstream may contain both encoded data and associated metadata.

Herein, at least one encoded frame corresponds to audio data which is encoded using an Advanced Audio Coding codec, or AAC codec. The AAC codec is an audio coding standard for lossy digital audio compression, which advantageously results in a better sound quality than what can be achieved with a MP3 codec at the same bit rate.

Figure 4:
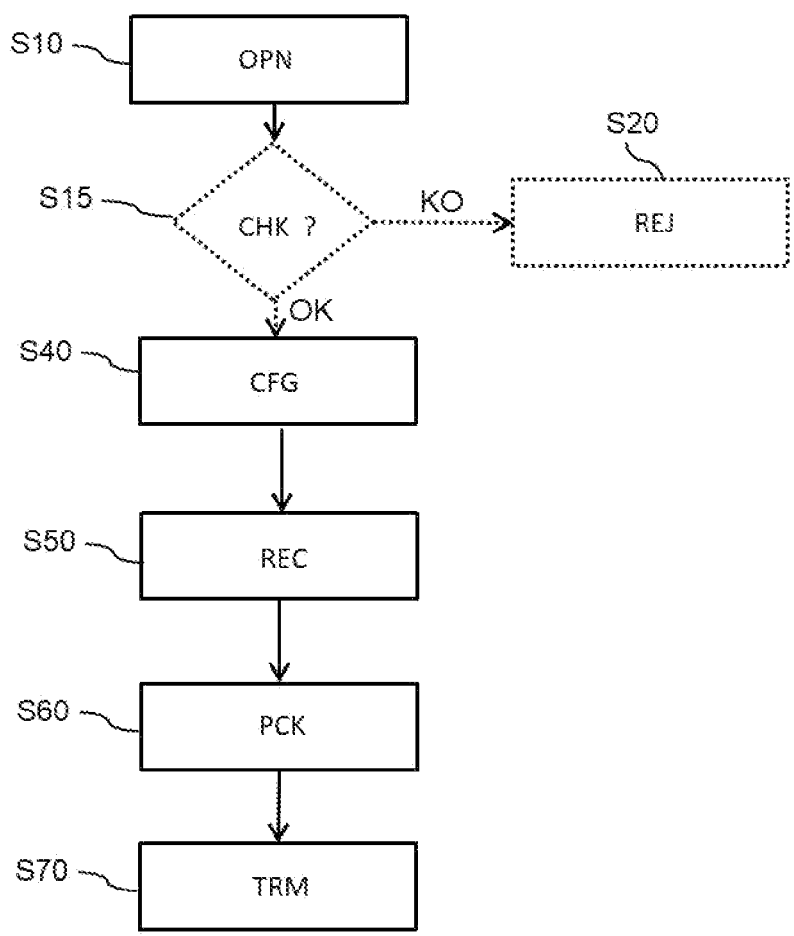
FIG. 4 illustrates method steps according to a second embodiment of the disclosure.

FIG. 4 illustrates method steps according to a second embodiment of the disclosure.

The method steps of the second embodiment allow transmitting an audio stream over a Bluetooth communication link similarly to the first embodiment, but so that said transmitting is performed upon a successful negotiation of the audio codec configuration and of the sampling rate.

During step S10, a Bluetooth communication link is open, that is, established between the source device 10 and the sink device 20. When a streaming application running on the source device 10 is ready to send audio data, said streaming application can request the opening of a new stream. Alternatively, or simultaneously, a reconfiguration of an existing stream can be requested when opening the Bluetooth communication link. In either case, this process can include the source device receiving an audio codec configuration and a sampling rate for the new or reconfigured stream from the streaming application.

While establishing the Bluetooth communication link, an optional negotiation phase can be carried out during a step S15.

Said negotiation phase comprises checking if one or more parameters of the stream are supported by the sink device 20. For instance, said one or more parameters are passed as arguments of the stream being opened or reconfigured.

Said one or more parameters comprise at least one audio codec configuration and one sampling rate of the audio stream of the streaming application running on the source device 10. The required codec and the sampling rate can be passed as an argument of the stream.

During step S15, and if the sink device 20 does not support the audio codec configuration and/or the sampling rate, the underlying request for opening the new stream of for reconfiguring the existing stream can be rejected during a step S20.

During step S15, and if the sink device 20 supports the codec and the sampling rate, the request is accepted and the source device 10 carries out the following steps, including step S40, as described hereafter.

During step S40, a configuration of the new stream is carried out or, if appropriate, a reconfiguration of the existing stream, using the one or more parameters. In particular, said configuration is carried out using the audio codec configuration and the sampling rate of the audio stream of the streaming application.

Preferably, a Host Controller Interface, called HCI, of the source device 10 is used to carry out step S40.

Herein, an HCI is an optional standard interface between a Controller subsystem and a Host subsystem. In Bluetooth devices having simple functionality (e.g., headsets), the host and the controller can be implemented on a same microprocessor or as an internal software interface. The HCI of the source device 10 can perform the configuration or the reconfiguration of the stream during step S40, which is for instance a Bluetooth A2DP stream.

During step S50, the source device 10 receives the audio stream from the streaming application.

During step S60, the source device packetizes the received audio stream into the Bluetooth audio stream which has been configured during step S40 using the audio codec configuration and the sampling rate.

During step S70, the source device 10 transmits the Bluetooth audio stream comprising the packetized received audio stream to the sink device 20.

Figure 5:
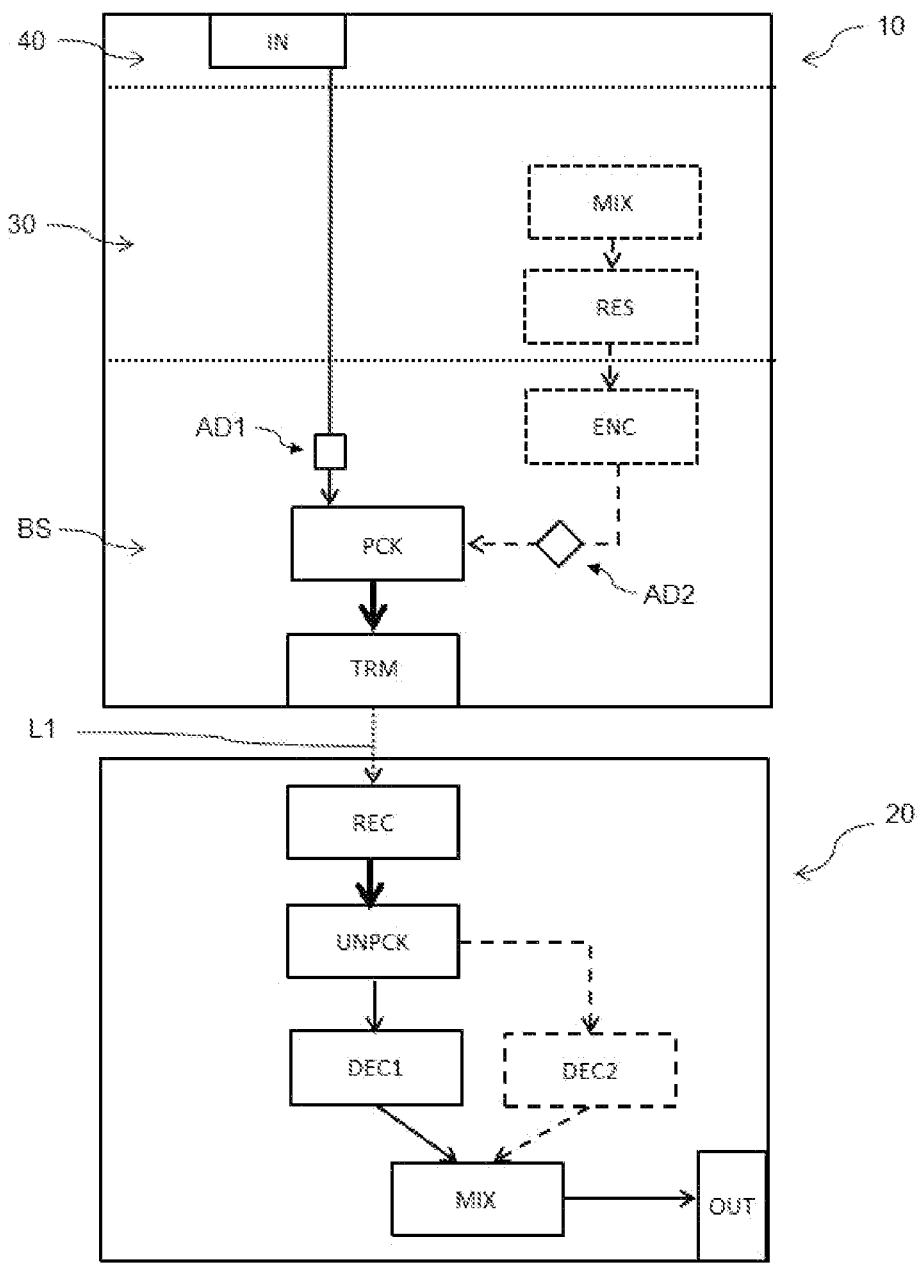
FIG. 5 illustrates a flowchart of method steps according to a third embodiment of the disclosure.

FIG. 5 illustrates a flowchart of method steps according to a third embodiment of the disclosure. In this third embodiment, not only the audio data AD1 is received by the Bluetooth stack BS from the input IN of the source device 10, but also audio data AD2 sent by an audio server 30 comprised in the source device 10 (said audio data AD2 may be for instance of system audio notification).

Both AD1 and AD2 are then packetized into a configured Bluetooth audio stream using the audio codec configuration and the sampling rate of the audio stream of the streaming application 40.

The configured Bluetooth audio stream is then transmitted from the source device 10 to the sink device 20 using an established Bluetooth link L1, and both packetized audio data AD1 and AD2 are unpacketized by the sink device 20, and optionally, decoded in one or more distinct steps before being rendered, broadcast or further streamed through the output OUT.

If, after the unpacketizing, the audio data is decoded during separate steps by the sink device 20, the decoded data can be subsequently mixed or multiplexed before being rendered, broadcast or further streamed through the output OUT (the Bluetooth audio stream may then additionally comprise information on the way to mix data, e.g. the respective percentage/value of volume for each audio data on the sink device side).

This allows combining multiple audio sources. Advantageously, and for instance, this allows receiving audio notifications, e.g. notifications from a social media application installed on the source device 10, while simultaneously listening to a music file provided by a streaming application 40 running on the source device 10.

Preferably, when more than one or more than two audio sources are present, the corresponding audio data may be mixed in at least one audio server and resampled using the sampling rate of the sink device 20, which corresponds to the sampling rate of the streaming application 40 when an existing stream has been reconfigured.

In other words, the shown embodiment allows several audio sources, including the streaming application 40 and at least one audio server 30, to use a simplified audio link path for the streaming application.

Figure 6:
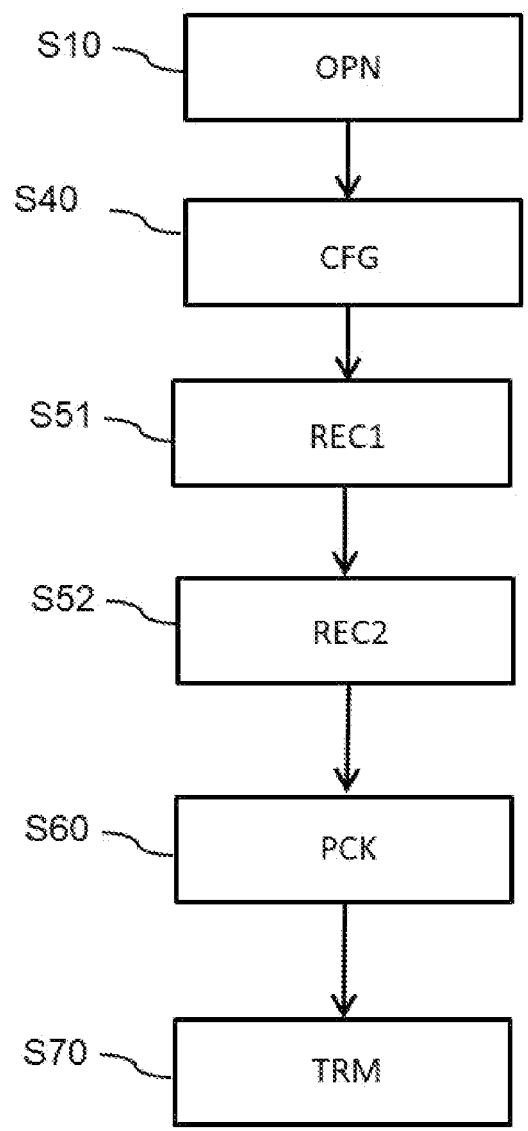
FIG. 6 illustrates method steps according to the third embodiment of the disclosure.

FIG. 6 illustrates method steps for transmitting an audio stream over a Bluetooth communication link, according to the third embodiment of the disclosure.

In particular, the method steps of the third embodiment allow transmitting an audio stream over a Bluetooth communication link similarly to the first and second embodiments, except that the reception step S50 is replaced by two steps S51 and S52 which are either carried out simultaneously or successively. Step S51 comprises receiving, by the source device 10, first audio data AD1 from the streaming application 40 and step S52 comprises receiving, by the source device 10, second audio data AD2 from the audio server 30.

Figure 7:
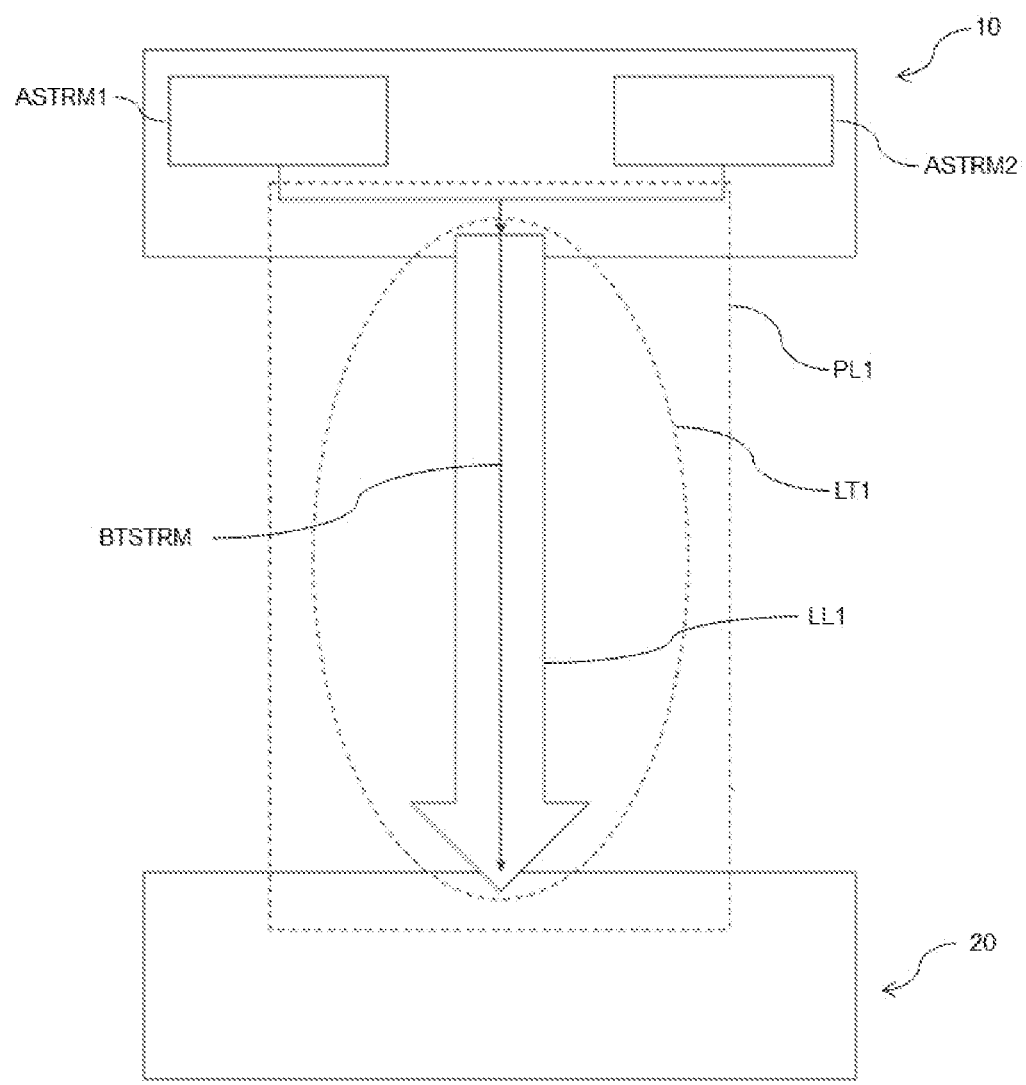
FIG. 7 illustrates a Bluetooth communication link according to the third embodiment of the disclosure.

FIG. 7 illustrates a Bluetooth communication link for carrying out the third embodiment of the disclosure.

In particular, a Bluetooth audio stream BTSTRM, corresponding to the packetization of two audio streams, is transmitted from the source device 10 to the sink device 20, said Bluetooth audio stream BTSTRM comprising a first contribution ASTRM1 and a second contribution ASTRM2. Preferably; said first contribution ASTRM1 is an audio stream provided by the streaming application running on the source device 10 and said second contribution ASTRM2 is an audio stream provided by an audio server.

Preferably, the Bluetooth audio stream BTSTRM is an A2DP Bluetooth audio stream.

The Bluetooth audio stream BTSTRM is enabled by a logical link LL1, and preferably an ACLU logical link.

Herein, a logical link is a link which defines what type of information is carried by the Bluetooth audio stream BTSTRM. For instance, said logical link carries control data or user data, said user data being subdivided into framed data and unframed data.

Preferably, the logical link LL1 is carried by a logical transport LT1, and preferably an ACL logical transport.

Herein, a logical transport is a wireless transport which defines what type of characteristics is carried by the stream. Moreover, a logical transport can support one or more logical links and said characteristics comprise casting type, scheduling behavior, acknowledgment/repeat mechanisms, flow control, and sequence numbering, among others. In particular, Bluetooth logical transports can carry different types of logical links, depending on the type of logical transport, and when several Bluetooth logical links are used, said Bluetooth logical links can be multiplexed onto the same logical transport.

Examples of logical transports include asynchronous connection-oriented, or ACL, synchronous connection-oriented, or SCO, extended synchronous connection-oriented, or eSCO, active slave broadcast, or ASB, connectionless slave broadcast, or CSB, LE asynchronous connection, or LE ACL, LE advertising broadcast, or ADVB, LE periodic advertising broadcast, or PADVB, transports. Other examples include LE connected isochronous and broadcast isochronous streams.

The Bluetooth audio stream BTSTRM, the logical link LL1 and the logical transport LT1 define a communication link. Thus, the communication link is defined by at least one physical link between two devices. Further, said communication link includes one or more physical links, and defines the wireless communication between two devices and, in the present case, between the source device 10 and the sink device 20.

The Bluetooth audio stream BTSTRM, the logical link LL1 and the logical transport LT1 define a physical link PL1, such as a BR/EDR physical link.

Herein, a physical link is a BR/EDR physical link or a LE physical link, which allows enabling a baseband connection between wireless devices. BR/EDR physical links include BR/EDR active physical links and BR/EDR connectionless slave broadcast physical links. LE physical links include LE active physical links, LE advertising physical links, LE periodic physical links, and LE isochronous physical links.

Preferably, the physical link PL1 is an active BR/EDR physical link or a LE isochronous physical link.

Figure 8:
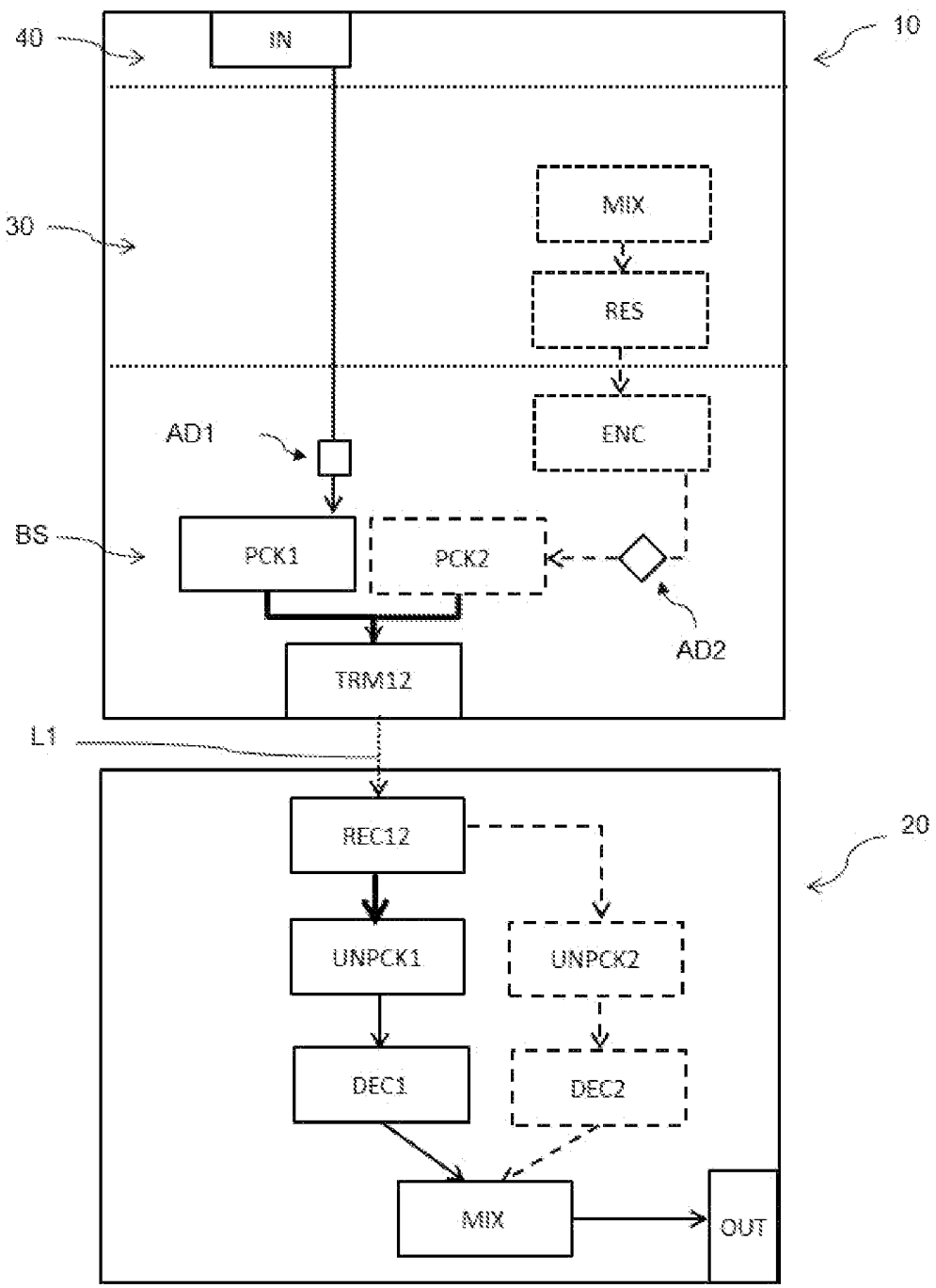
FIG. 8 illustrates a flowchart of method steps according to a fourth embodiment of the disclosure.

FIG. 8 illustrates a flowchart of method steps according to a fourth embodiment of the disclosure.

In this fourth embodiment, the audio data AD1 being received from the streaming application 40 is packetized using the audio codec configuration and the sampling rate of the streaming application 40 into the Bluetooth audio stream configured. Simultaneously or successively, audio data AD2 which corresponds to a second audio stream coming from the audio server 30 is packetized into said Bluetooth audio stream using the audio codec configuration and the sampling rate of the second audio stream.

As an alternative, the two audio streams use the same audio codec configuration and sampling rate. It is then possible to transmit these two audio streams over a same Bluetooth communication link L1, as shown.

When AD1 and of AD2 are packetized into the same Bluetooth audio stream, they can be later unpacketized and decoded by the sink device 20. In particular, the unpacketizing and the decoding can be carried out simultaneously or successively for each of AD1 and of AD2.

Figure 9:
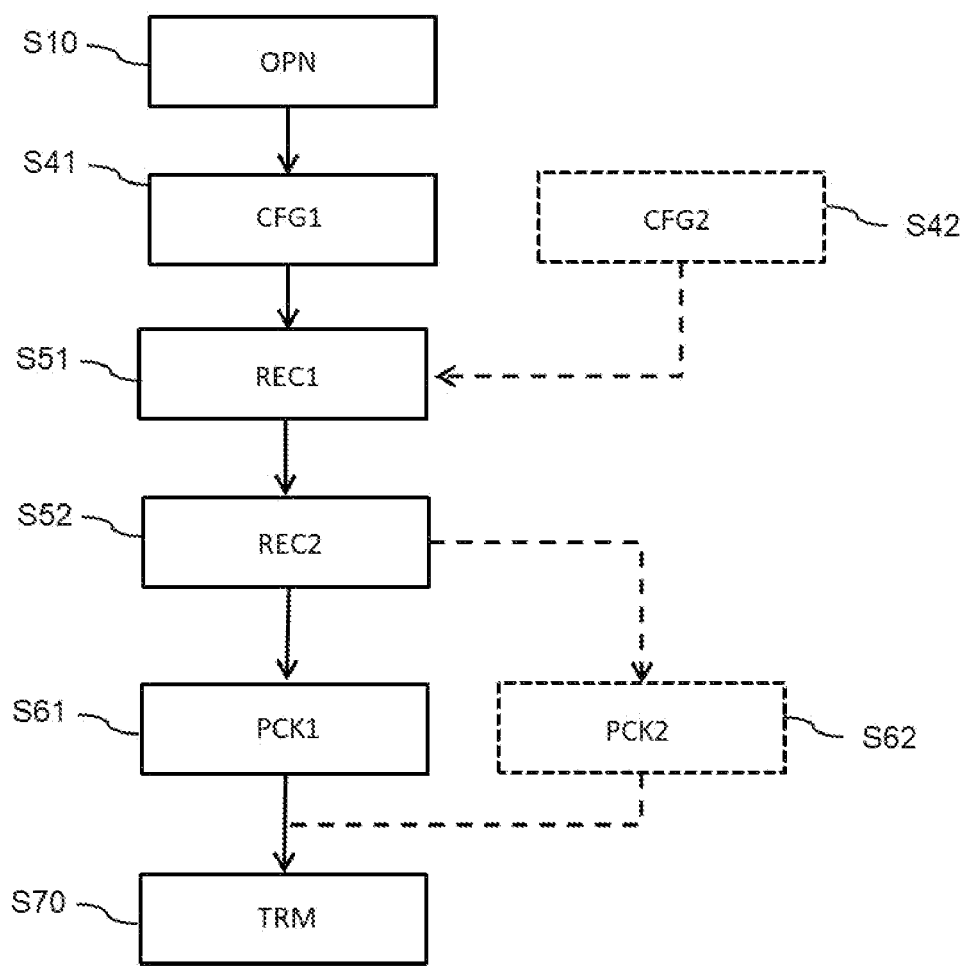
FIG. 9 illustrates method steps according to the fourth embodiment of the disclosure.

FIG. 9 illustrates method steps according to the fourth embodiment of the disclosure. In particular, these method steps allow transmitting two audio streams over a Bluetooth communication link.

During step S10, and as described previously, a Bluetooth link is opened or pre-established between the source device and the sink device. Preferably, this is carried out when the streaming application running on the source device requests to open at least one audio stream. The opening of an audio stream by the streaming application can include the source device receiving an audio codec configuration and a sampling rate from the streaming application.

During step S41, said at least one Bluetooth audio stream is configured or reconfigured with an audio codec configuration and a sampling rate of the streaming application 40.

During step S42, which is carried out either successively or simultaneously with respect to step S41, at least one another Bluetooth audio stream is configured or reconfigured with an audio codec configuration and a sampling rate of the audio server 30, or with the audio codec configuration and the sampling rate of the streaming application.

During step S51, the source device 10 receives the audio stream from the streaming application 40, called first audio stream. During step S52, which is carried out either successively or simultaneously with respect to step S51, the source device receives the audio stream from the audio server 30, called second audio stream.

During step S61, the source device packetizes the first audio stream into the Bluetooth audio stream which has been configured during step S41 using the audio codec configuration and the sampling rate of the streaming application.

During an optional step S62, which is carried out either successively or simultaneously with respect to step S61, the source device packetizes the second audio stream into said Bluetooth audio stream.

During step S70, the source device 10 transmits the Bluetooth audio streams comprising the packetized first and second audio streams to the sink device 20.

As an alternative to step S70, steps S61 and S62 may be followed by two distinct transmission steps S71 and S72 which are not represented. In such a situation, the first and second packetized audio streams can be transmitted through separate logical links.

Figure 10:
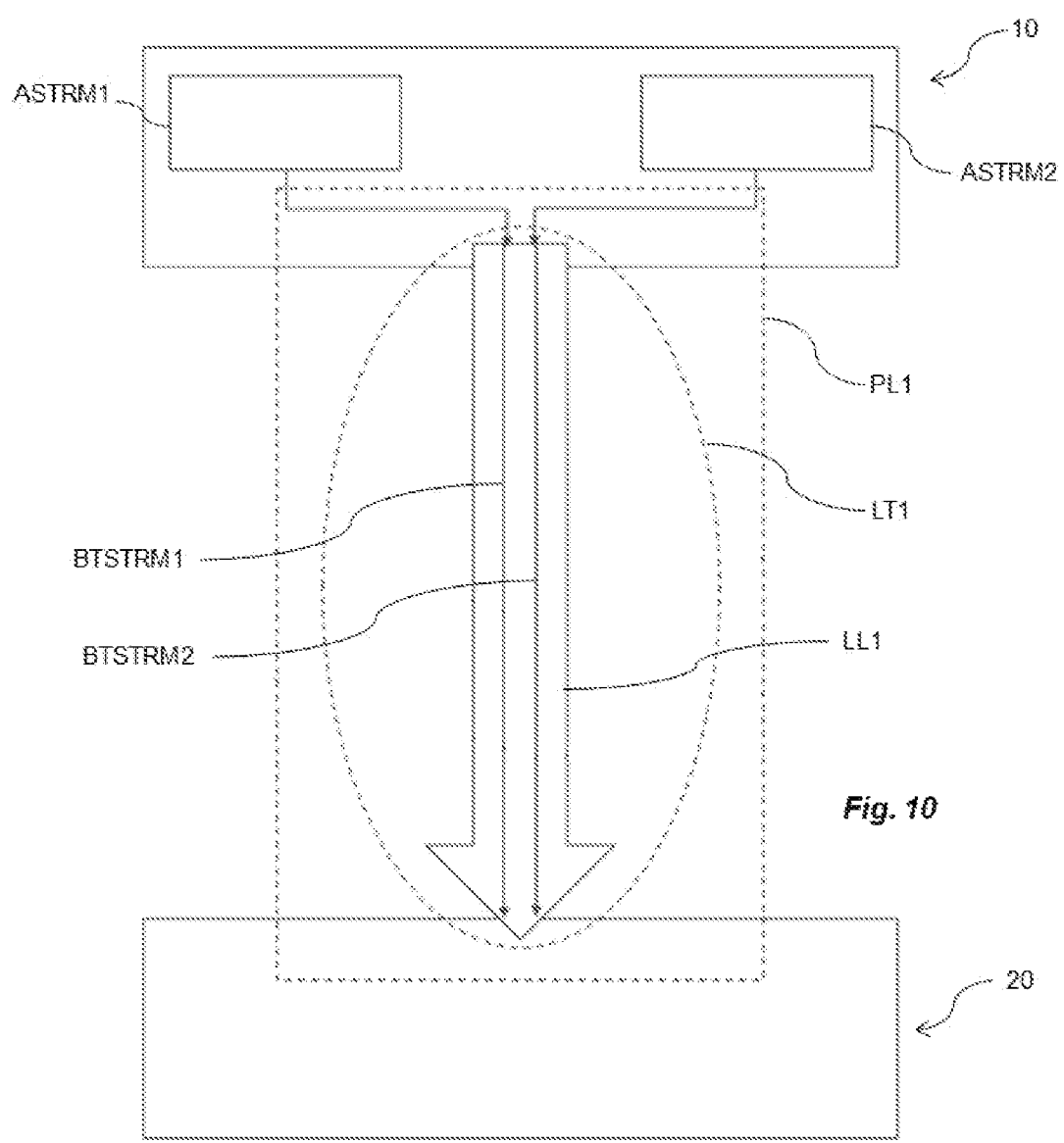
FIG. 10 illustrates a Bluetooth communication link according to the fourth embodiment of the disclosure.

FIG. 10 illustrates a Bluetooth communication link for carrying out the fourth embodiment of the disclosure.

As illustrated, two Bluetooth audio streams BTSTRM1 and BTSTRM2 are transmitted from the source device 10 to the sink device 20 over a single Bluetooth communication link.

In particular, the first Bluetooth audio stream BTSTRM1 comprises a first contribution ASTRM1 and the second Bluetooth audio stream BTSTRM2 comprises a second contribution ASTRM2, said first contribution ASTRM1 being the audio stream provided by the streaming application 40 running on the source device 10 and the second contribution ASTRM2 being the audio stream provided by the audio server 30.

Preferably, the Bluetooth audio streams BTSTRM1 and BTSTRM2 are each A2DP Bluetooth audio streams, said Bluetooth audio streams being enabled by one logical link LL1, such as an ACL-U logical link, carried by one logical transport LT1, such as an ACL logical transport. The Bluetooth audio streams BTSTRM1 and BTSTRM2, the logical link LL1 and the logical transport LT1 define a physical link PL1, preferably a BR/EDR active physical link.

Figure 11:
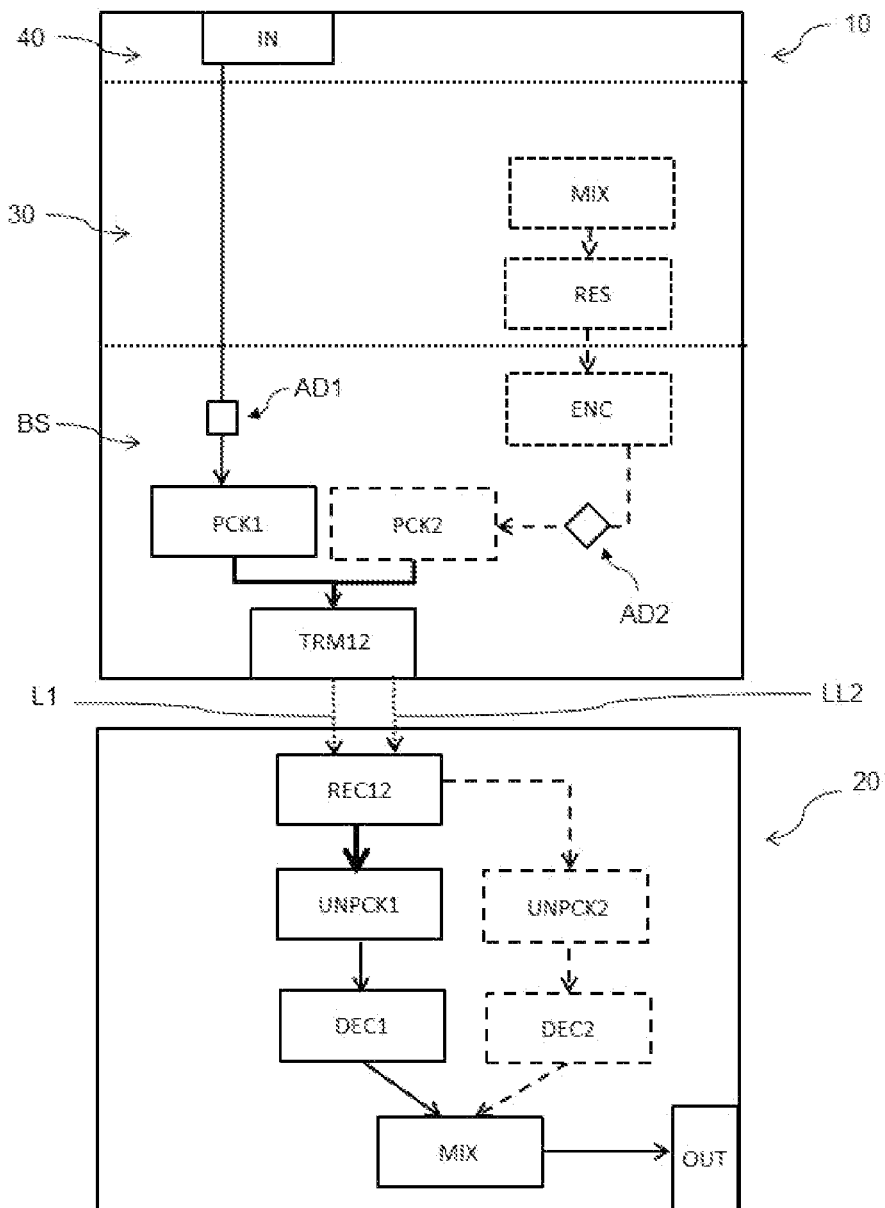
FIG. 11 illustrates a flowchart of method steps according to a fifth embodiment of the disclosure.

FIG. 11 illustrates a flowchart of method steps according to a fifth embodiment of the disclosure.

In particular, the method steps of the fifth embodiment are similar to those of the fourth embodiment except that, in addition to the Bluetooth communication link L1, at least one another Bluetooth logical link LL2 is open between the source device 10 and the sink device 20. This allows transmitting one or more audio streams over two distinct Bluetooth logical links.

For instance, said at least another link LL2 is opened during step S10 when the streaming application 40 requests opening a stream.

Figure 12:
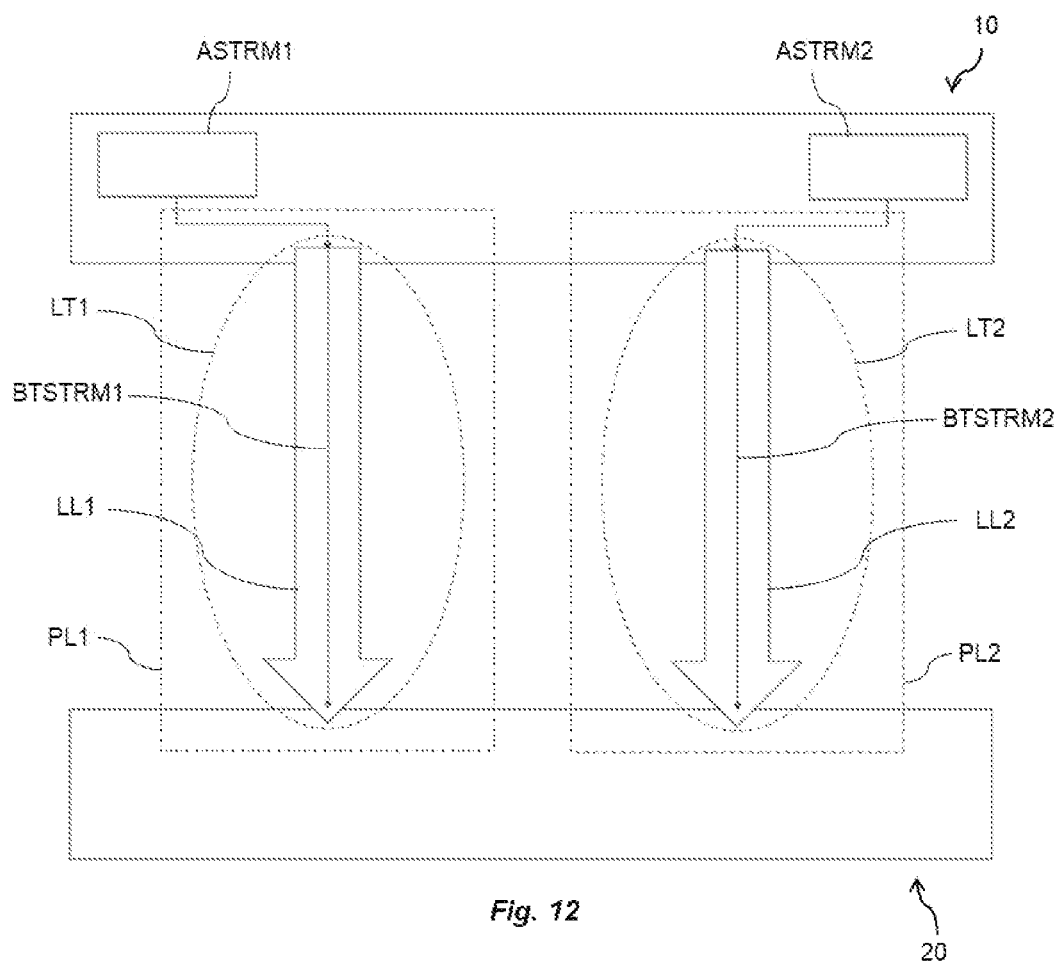
FIG. 12 illustrates Bluetooth communication links according to the fifth embodiment of the disclosure.

FIG. 12 illustrates two Bluetooth communication links for carrying out the fifth embodiment of the disclosure.

As illustrated, two Bluetooth audio streams BTSTRM1 and BTSTRM2 are transmitted from the source device 10 to the sink device 20. The first Bluetooth audio stream BTSTRM1 comprises a first contribution ASTRM1, and the second Bluetooth audio stream BTSTRM2 comprises a second contribution ASTRM2. Again, said first contribution ASTRM1 is the audio stream provided by the streaming application 40 and said second contribution ASTRM2 is the audio stream provided by the audio server 30.

The Bluetooth audio stream BTSTRM1 is enabled by a logical link LL1, such as an ACL-U logical link, while the Bluetooth audio stream BTSTRM2 is enabled by another logical link LL2, such as a LE-S logical link.

The logical link LL1 is carried by a logical transport LT1, such as an ACL logical transport, while the logical link LL2 is carried by another logical transport LT2, such as a LE connected isochronous logical transport.

The Bluetooth audio stream BTSTRM1, the logical link LL1 and the logical transport LT1 define a physical link PL1, which is preferably a BR/EDR active physical link. The Bluetooth audio stream BTSTRM2, the logical link LL2 and the logical transport LT2 define a physical link PL2, which is preferably a LE isochronous physical link.

Figure 13:
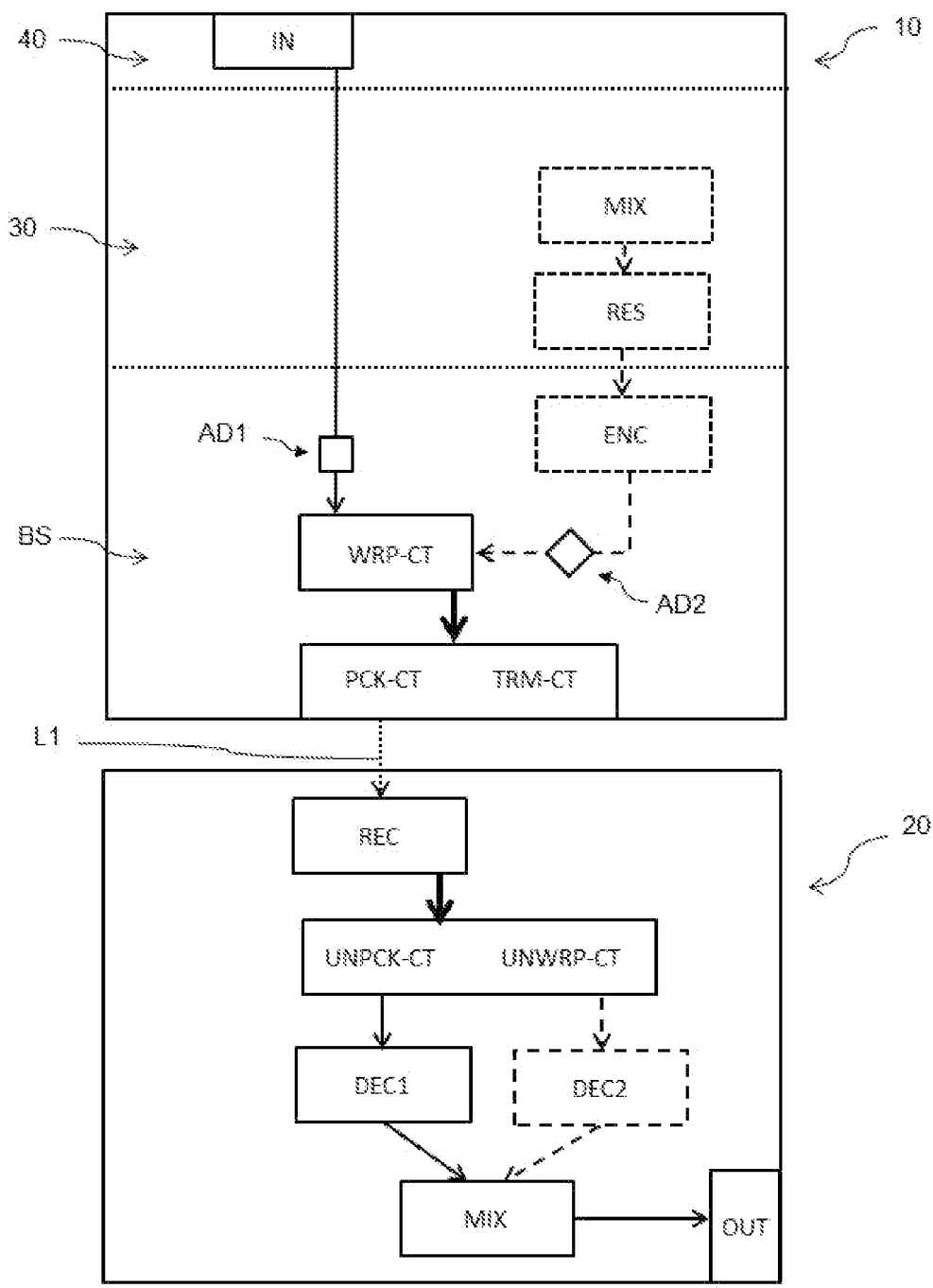
FIG. 13 illustrates a flowchart of method steps according to a sixth embodiment of the disclosure.

FIG. 13 illustrates a flowchart of method steps according to a sixth embodiment of the disclosure.

In particular, these method steps are similar to those of the first, second and third embodiments except that the packetizing of the audio data AD1 and AD2 is carried out by wrapping said audio data in a container, such as an Ogg-container. This results in a physical bitstream which can subsequently be packetized and transmitted over a Bluetooth communication link established between the source device 10 and the sink device 20.

After said container, or physical bitstream, is received by the sink device 20, it is subsequently unpacketized and unwrapped. Subsequent decoding steps can then be carried out, one decoding step being carried out for the logical bitstream of the physical bitstream which corresponds to the streaming application, and another decoding step being carried out for the logical bitstream of the physical bitstream which corresponds to the audio server. The two decoding steps can be carried out separately or together as a single decoding step.

Figure 14:
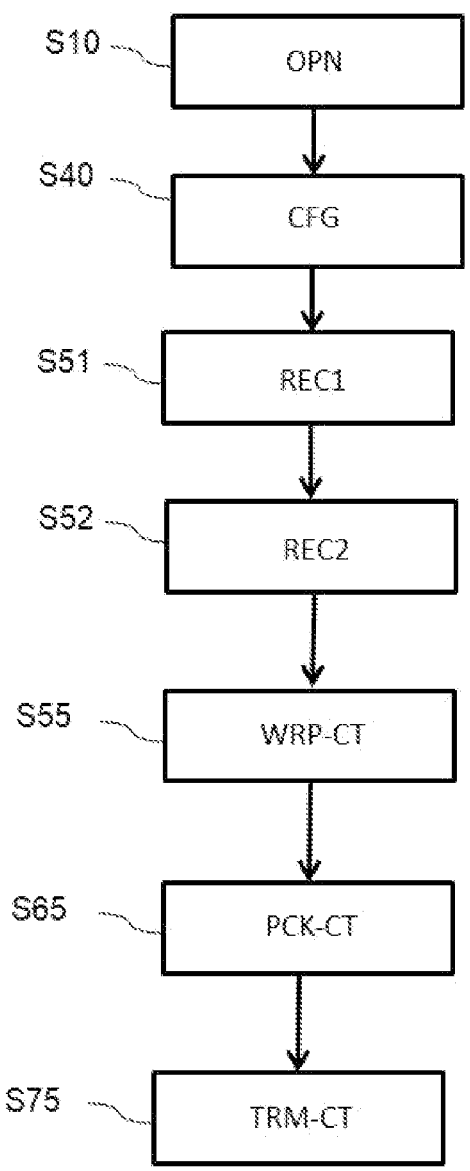
FIG. 14 illustrates method steps according to the sixth embodiment of the disclosure.

FIG. 14 illustrates method steps corresponding to the sixth embodiment of the disclosure.

Specifically, after receiving the first audio stream during step S51 and after receiving the second audio stream during step S52, the two audio streams are packetized into a container CT during a step S55, then packetized during a step S65, before eventually being transmitted during a step S75 to the sink device 20.

Figure 15:
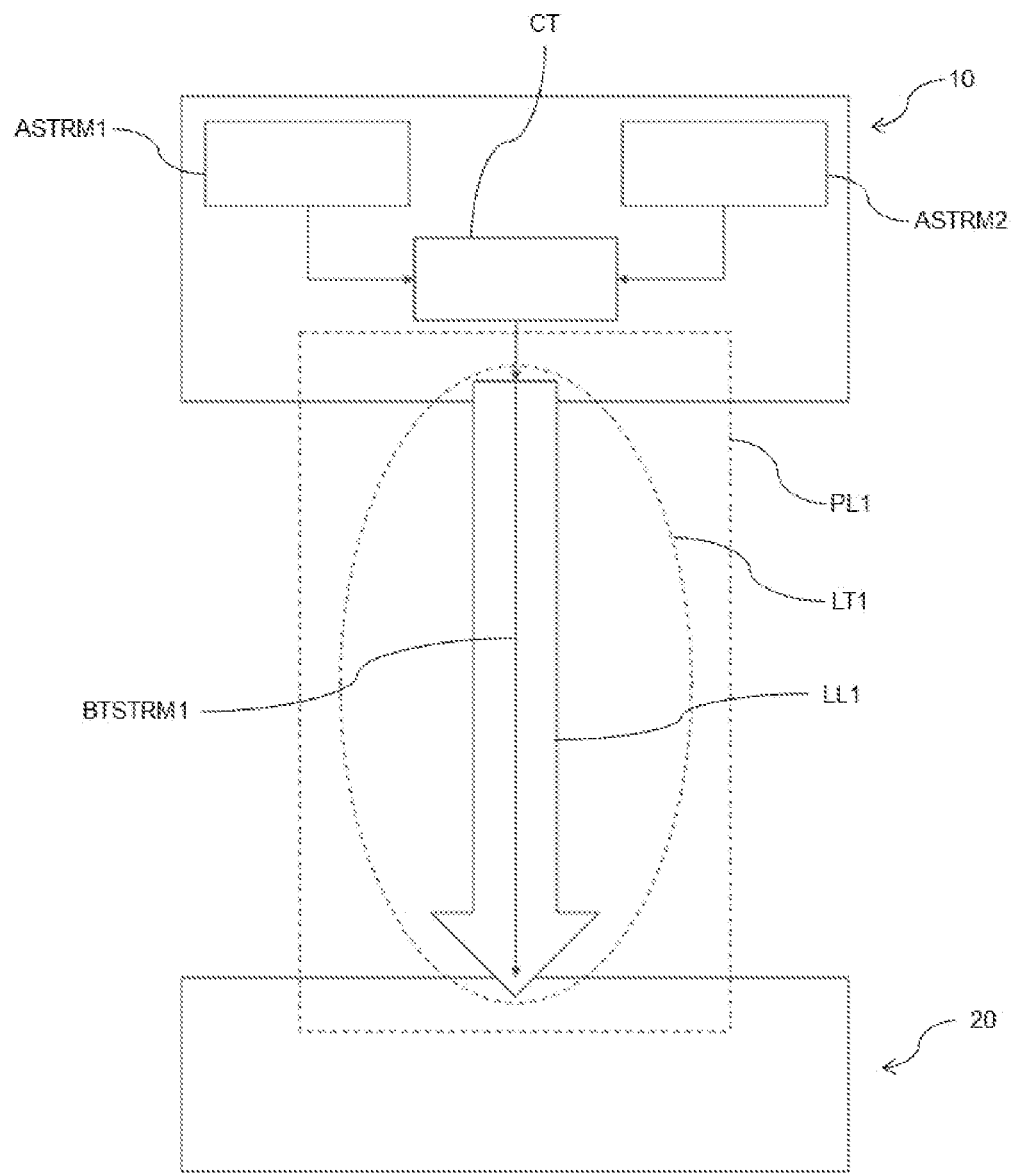
FIG. 15 illustrates a Bluetooth communication link according to the sixth embodiment of the disclosure.

FIG. 15 illustrates a Bluetooth communication link for carrying out the sixth embodiment of the disclosure.

Specifically, a Bluetooth audio stream BTSTRM1 is transmitted from the source device 10 to the sink device 20, said Bluetooth audio stream BTSTRM1 comprising a first contribution ASTRM1 and a second contribution ASTRM2. Said first contribution ASTRM1 is an audio stream provided by the streaming application running on the source device 10 and said second contribution ASTRM2 is an audio stream provided by an audio server.

In the present case, the two contributions ASTRM1 and ASTRM2 are encapsulated in a container CT before being transmitted from the source device 10 to the sink device 20.

Again, the Bluetooth communication link defined by the audio stream BTSTRM1, the logical link LL1 and the logical transport LT1 can include one or more physical links and defines the wireless communication between the source device 10 and the sink device 20.

Again, and preferably, the Bluetooth audio stream BTSTRM1, the logical link LL1 and the logical transport LT1 define a physical link PL1, such as a BR/EDR physical link.

Advantageously, the container CT is here an Ogg-Vorbis container. While Bluetooth standards merely allow packetizing audio data in a single audio stream, using an Ogg-Vorbis container allows having multiple audio streams in a same packet. In other words, using Ogg-Vorbis containers, or Ogg stream containers, allows encapsulating one or more logical bitstreams.

Moreover, this allows providing the sink device 20 the required information to properly separate the audio data back without relying on decoding to find the corresponding packet boundaries. In this case, the codec used to encode the audio data provided by the audio server 30 should be compatible with the container CT.

Once encoded, a logical bitstream coming from the audio server can be wrapped into the container with the logical bitstream of the streaming application. Both logical bitstreams can then be sent within a same packet to the sink device 20. Said sink device 20 can then unwrap the two logical bitstreams, decode them separately using their respective codecs, and carry out a mixing of the decoded result to provide a single stream to be output.

Figure 16:
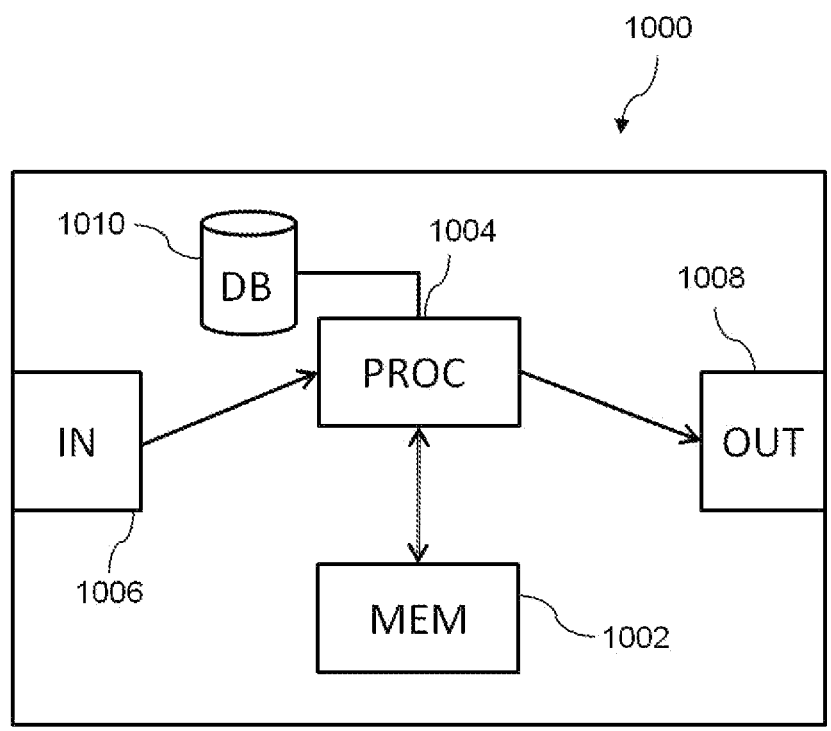
FIG. 16 illustrates the structure of a circuit according to embodiments of the disclosure.

FIG. 16 shows a device 1000 adapted for implementing a method according to an embodiment of the disclosure, and specifically, a method for transmitting or for receiving an audio stream over a Bluetooth communication link when managing a plurality of multimedia devices.

In an embodiment, the device 1000 comprises a Bluetooth chip, which is integrated in an electronic circuit or in any type of electronic device, such as the source device or the sink device.

As illustrated, the device 1000 comprises a storage space 1002, for example a memory MEM including a random access memory 1002. The storage space 1002 can also be a nonvolatile memory such as a ROM or a Flash memory, and can provide a recording medium, said recording medium being configured to store a computer program product.

The device 1000 further comprises a processing unit 1004 equipped for example with a circuit which includes or is a processor PROC. The processing unit 1004 can be controlled by a program, such as a computer program implementing the managing method as described herein with reference to any of the previous figures. The processing unit 1004 can store instructions for performing the steps described with reference to any of the aforementioned embodiments.

The device 1000 may also comprise a database 1010 for storing data like audio data, an audio stream, a container or any bitstream. The database 1010 can further store any information such as an audio codec configuration or a sampling rate.

The device 1000 further comprises an input interface 1006 and an output interface 1008, which are configured for establishing a communication to and from the multimedia device to external devices. For instance, the output interface 1008 can be a communication module enabling the device 1000 to connect via Bluetooth and for exchanging data with other devices via Bluetooth. The communication module preferably includes a Bluetooth communication module.

Throughout this disclosure, the opening of a new audio stream was provided as an example of the point in various disclosed processes at which a source device received an audio codec configuration and a sampling rate from a streaming application. The audio codec configuration and sampling rate being part of the information provided to the source device whilst that stream was being created. However, there are many ways in which the processes can involve receiving an audio codec configuration and a sampling rate of an audio stream coming from a streaming application running on the source device. For example, the codec configuration and sampling rate can be received as part of establishing the communication link when the source and sink are supporting an audio service (e.g., Advanced Audio Distribution Profile or A2DP in Bluetooth classic). In these approaches both the codec and the sampling rate are negotiated when the audio service is configured. As another example, the codec configuration and sampling rate can be received as part of the reconfiguration of an audio service for an already established communication link between two devices. As another example, the codec configuration and sampling rate can be provided through custom control or signaling messages in case the two devices are implementing a custom service that is outside the scope of the Bluetooth standard.

According to an embodiment, the Bluetooth chip is configured to implement one or more of the steps that have been described in the present disclosure.

Herein, expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

While there has been illustrated and described embodiments of the present invention, it will be understood by those skilled in the art that various other modifications may be made, and equivalents may be substituted, without departing from the true scope of the present invention. Additionally, many modifications may be made to adapt a particular situation to the teachings of embodiments of the present invention without departing from the scope of the invention. Furthermore, an embodiment of the present invention may not include all of the features described above. Therefore, it is intended that the present invention not be limited to the particular embodiments disclosed, but that the invention includes all embodiments falling within the scope of the appended claims.

A person skilled in the art will readily appreciate that various parameters disclosed in the description may be modified and that various embodiments disclosed and/or claimed may be combined without departing from the scope of the invention.

What is claimed is:

1. A method for transmitting an audio stream over a Bluetooth communication link, the method being carried out by a source device and comprising:
   receiving an audio codec configuration and a sampling rate of a first audio stream, said first audio stream coming from a streaming application running on the source device, and said audio codec configuration and said sampling rate being associated with an encoding format of the first audio stream;
   configuring, after receipt of the audio codec configuration and sampling rate of the first audio stream, a first Bluetooth audio stream between the source device and a sink device using the received audio codec configuration and sampling rate;
   receiving the first audio stream from the streaming application;
   wrapping the received first audio stream into a container without modifying the encoding format of the received first audio stream, and placing the container into said first Bluetooth audio stream; and
   transmitting the first Bluetooth audio stream to the sink device over the Bluetooth communication link, the transmitted first Bluetooth audio stream comprising the received first audio stream.

2. The method according to claim 1, wherein the receiving of the first audio stream from the streaming application is carried out upon receipt of an unmodified bitstream from the streaming application.

3. The method according to claim 1, further comprising:
   receiving at least a second audio stream, said second audio stream being different from the first audio stream, from an audio server; and
   transmitting said received second audio stream to the sink device over the Bluetooth communication link.

4. The method according to claim 3, wherein the first Bluetooth audio stream is of a multi-contribution type, the method further comprising packetizing the received second audio stream into the first Bluetooth audio stream using the audio codec configuration and a sampling rate of the second audio stream.

5. The method according to claim 3, further comprising wrapping the received second audio stream into the container.

6. The method according to claim 5, wherein the container is an Ogg-Vorbis container.

7. The method according to claim 5, wherein at least one of the first audio stream and the second audio stream is a Vorbis encoded stream.

8. The method according to claim 3, further comprising:
   packetizing the received second audio stream into a second Bluetooth audio stream, said second Bluetooth audio stream being distinct from the first Bluetooth audio stream, and
   transmitting said second Bluetooth audio stream to the sink device over the Bluetooth communication link, the second Bluetooth audio stream being multiplexed with the first Bluetooth audio stream.

9. The method according to claim 8, wherein at least one of the first Bluetooth audio stream and the second Bluetooth audio stream is transmitted over a BR/EDR link of the Bluetooth communication link.

10. The method according to claim 8, wherein the second Bluetooth audio stream is transmitted over a BLE link of the Bluetooth communication link.

11. The method of claim 1, wherein the transmitting of the first Bluetooth audio stream is performed upon a successful negotiation, with the sink device, of the audio codec configuration and of the sampling rate.

12. A non-transitory, computer-readable medium having stored thereon computer program instructions loadable into a computing device and adapted to, when loaded into and executed by said computing device, cause the computing device to perform operations comprising:
    receiving an audio codec configuration and a sampling rate of a first audio stream, said first audio stream coming from a streaming application running on a source device, and said audio codec configuration and said sampling rate being associated with an encoding format of the first audio stream;
    configuring, after receipt of the audio codec configuration and sampling rate of the first audio stream, a first Bluetooth audio stream between the source device and a sink device using the received audio codec configuration and sampling rate;
    receiving the first audio stream from the streaming application;
    wrapping the received first audio stream into a container without modifying the encoding format of the received first audio stream, and placing the container into said first Bluetooth audio stream; and
    transmitting the first Bluetooth audio stream to the sink device over a Bluetooth communication link, the transmitted first Bluetooth audio stream comprising the received first audio stream.

13. The non-transitory, computer-readable medium according to claim 12, wherein the receiving of the first audio stream from the streaming application is carried out upon receipt of an unmodified bitstream from the streaming application.

14. The non-transitory, computer-readable medium according to claim 12, the operations further comprising:
    receiving at least a second audio stream, said second audio stream being different from the first audio stream, from an audio server; and
    transmitting said received second audio stream to the sink device over the Bluetooth communication link.

15. The non-transitory, computer-readable medium according to claim 14, wherein the first Bluetooth audio stream is of a multi-contribution type, the operations further comprising packetizing the received second audio stream into the first Bluetooth audio stream using the audio codec configuration and a sampling rate of the second audio stream.

16. The non-transitory, computer-readable medium according to claim 14, the operations further comprising wrapping the received second audio stream into a container, said container being placed into the first Bluetooth audio stream.

17. The non-transitory, computer-readable medium according to claim 16, wherein at least one of the first audio stream and the second audio stream is a Vorbis encoded stream.

18. The non-transitory, computer-readable medium according to claim 14, the operations further comprising:
   packetizing the received second audio stream into a second Bluetooth audio stream, said second Bluetooth audio stream being distinct from the first Bluetooth audio stream, and
   transmitting said second Bluetooth audio stream to the sink device over the Bluetooth communication link, the second Bluetooth audio stream being multiplexed with the first Bluetooth audio stream.

19. The non-transitory, computer-readable medium of claim 12, wherein the transmitting of the first Bluetooth audio stream is performed upon a successful negotiation, with the sink device, of the audio codec configuration and of the sampling rate.

20. A source device for transmitting an audio stream over a Bluetooth communication link, said source device being configured to:
   receive an audio codec configuration and a sampling rate of a first audio stream of a streaming application running on the source device, said audio codec configuration and said sampling rate being associated with an encoding format of the first audio stream;
   configure, after receipt of the audio codec configuration and sampling rate of the first audio stream, a first Bluetooth audio stream between the source device and a sink device, using the received audio codec configuration and sampling rate;
   receive the first audio stream from the streaming application;
   wrap the received audio stream into a container without modifying the encoding format of the received first audio stream, and placing the container into said first Bluetooth audio stream; and
   transmit the first Bluetooth audio stream to the sink device, the transmitted first Bluetooth audio stream comprising the received first audio stream.

\* \* \* \* \*